United States Patent
Choi

(10) Patent No.: US 8,530,766 B2
(45) Date of Patent: Sep. 10, 2013

(54) IN-CELL TOUCH PANEL FOR FLAT PANEL DISPLAY DEVICE

(75) Inventor: Howon Choi, Daegu (KR)

(73) Assignee: LG Display Co., Ltd., Seoul (KR)

( * ) Notice: Subject to any disclaimer, the term of this patent is extended or adjusted under 35 U.S.C. 154(b) by 130 days.

(21) Appl. No.: 13/243,339

(22) Filed: Sep. 23, 2011

(65) Prior Publication Data

US 2012/0097512 A1    Apr. 26, 2012

(30) Foreign Application Priority Data

Oct. 26, 2010  (KR) .................. 10-2010-0104601

(51) Int. Cl.
*H01H 9/26*    (2006.01)
(52) U.S. Cl.
USPC ......................................... 200/5 A; 200/600
(58) Field of Classification Search
USPC ................. 200/5 A, 600, 5 R, 46, 506, 512,
200/514, 310–315; 345/173, 174, 177, 178
See application file for complete search history.

(56) References Cited

U.S. PATENT DOCUMENTS

| | | | |
|---|---|---|---|
| 2007/0096565 A1* | 5/2007 | Breed et al. ................... | 307/116 |
| 2008/0142352 A1* | 6/2008 | Wright ........................... | 200/600 |
| 2009/0314621 A1* | 12/2009 | Hotelling ....................... | 200/600 |

FOREIGN PATENT DOCUMENTS

KR    20070102161 A    10/2007

OTHER PUBLICATIONS

Office Action issued in corresponding Korean Patent Application No. 10-2010-0104601, mailed May 28, 2013, 3 pages.

* cited by examiner

*Primary Examiner* — Edwin A. Leon
(74) *Attorney, Agent, or Firm* — Brinks Hofer Gilson & Lione

(57) ABSTRACT

The present disclosure relates to an in-cell touch panel embedded into the flat panel display devices. The present disclosure suggests an in-cell touch panel for flat panel display device comprising: a transparent substrate; a routing part having a conductive material formed on an inner side of the transparent substrate; a plurality of sensor lines running to a first direction on the inner side of the transparent substrate; a plurality of driving lines that each driving line has a plurality of segments running to a second direction between the sensor lines; a first insulating layer covering the sensor lines and the driving lines; a connecting part linking the segments of the driving line to the second direction; and a second insulating layer covering the whole surface of the transparent substrate having the connecting part.

4 Claims, 3 Drawing Sheets

IN-CELL TOUCH PANEL FOR FLAT PANEL DISPLAY DEVICE

This application claims the benefit of Korea Patent Application No. 10-2010-0104601 filed on Oct. 26, 2010, which is incorporated herein by reference for all purposes as if fully set forth herein.

BACKGROUND

1. Field of the Disclosure

The present disclosure relates to an in-cell touch panel embedded into the flat panel display devices. Especially, the present disclosure relates to a touch panel embedded inner surface of the upper glass substrate of the flat panel display devices.

2. Discussion of the Related Art

The touch panel is one of the input devices for entering the required information into the data process devices such as computer, PDA, SMART phone, cellular phone and so on. The touch panel can be installed on the surface of the display devices such as the cathode ray tube (or 'CRT'), the liquid crystal display device (or 'LCD' the field emission display (or 'FED'), the plasma display panel (or 'PDP'), the electro luminescence device (or 'ELD') and so on. So, the user can press or touch the touch panel with seeing the display information on the screen to input any information what he wants to enter.

The touch panel can be grouped into the add-on type and the on-cell type according to the structure. For the add-on type, the flat panel display device and the touch panel are independently manufactured and then the touch panel is attached on the outer surface of the upper substrate of the flat display device. For the on-cell type, all elements of the touch panel are directly formed on the upper glass substrate of the flat panel display device.

In the case of the add-on type, as the individual touch panel is attached on the flat display device, the total thickness of the final device will be thicker. Furthermore, the brightness of the display device may be degraded. In the case of the on-cell type, especially for the organic light emitting device (or 'OLED'), as all elements of the touch panel are formed on the outer surface of the cap glass, all elements of the touch panel will be exposed into the atmospheric circumstance. These exposed elements can be damaged during the manufacturing process.

Consequently, required is a new type touch panel or a new type flat panel display embedded with the new type touch panel thereon for overcoming these problems occurred in the conventional arts.

SUMMARY

An in-cell touch panel for flat panel display device comprises: a transparent substrate; a routing part having a conductive material formed on an inner side of the transparent substrate; a plurality of sensor lines running to a first direction on the inner side of the transparent substrate; a plurality of driving lines that each driving line has a plurality of segments running to a second direction between the sensor lines; a first insulating layer covering the sensor lines and the driving lines; a connecting part linking the segments of the driving line to the second direction; and a second insulating layer covering the whole surface of the transparent substrate having the connecting part.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
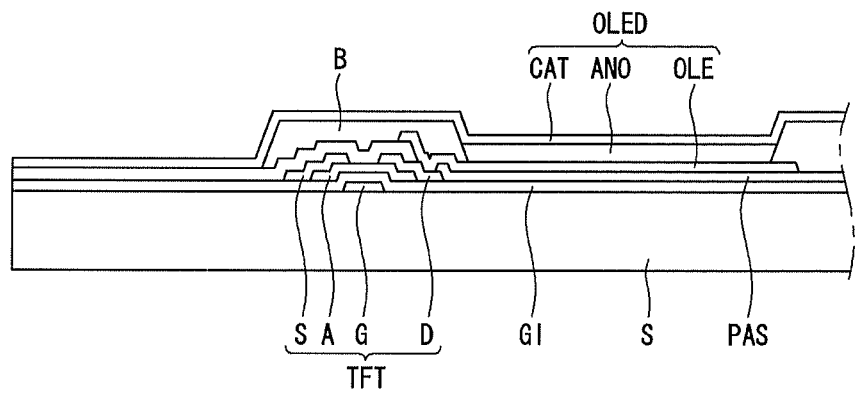
FIG. 1 is the cross sectional view illustrating the structure of the lower panel of the organic light emitting display device, a typical example of the flat panel display device, at which a in-cell type touch panel according to the present disclosure is applied.

Hereinafter, referring to attached FIGS. 1 to 5, we will explain preferred embodiments of the present disclosure. FIG. 1 is the cross sectional view illustrating the structure of the lower panel of the organic light emitting display device, a typical example of the flat panel display device, at which an in-cell type touch panel according to the present disclosure is applied. The preferred embodiments of the present disclosure suggests a flat display device in which an in-cell touch panel is embedded at the upper glass substrate of the organic light emitting display panel. As the organic light emitting display device is just one example explained in these embodiment, the in-cell touch panel according to the present disclosure can be applied to any type of flat panel display devices.

Referring to FIG. 1, the lower panel of the organic light emitting display device comprises the thin film transistor TFT and an organic light emitting diode OLED disposed on a substrate S. The thin film transistor TFT includes a gate electrode G on the substrate S, a gate insulating layer GI covering the gate electrode G, a semiconductor layer A overlapping with the gate electrode G on the gate insulating layer GI, a source electrode S contacting one side of the semiconductor layer A, and a drain electrode D facing with the source electrode S with a predetermined distance and contacting the other side of the semiconductor layer A.

On whole surface of the substrate S having the thin film transistor TFT, a passivation layer PAS is coated. On the passivation layer PAS, the organic light emitting diode OLED connected to the thin film transistor TFT is formed. The organic light emitting diode OLED includes an anode electrode ANO connecting to the drain electrode D through a drain contact hole on the passivation layer. Furthermore, a bank B is formed for covering the step shaped portions of the substrate such as area of thin film transistor TFT to make the surface of the substrate S have even level. On the anode electrode ANO of which portion is occupying the pixel area where the surface level is even due to the bank B, an organic light emitting material OLE is disposed. And, a cathode electrode CAT is formed on the whole surface of the substrate S having the organic light emitting material OLE.

In order to complete the organic light emitting display device, the lower panel as shown in FIG. 1 should be covered and sealed by an upper panel. In the present disclosure, the upper panel of the organic light emitting display device further includes elements for touch panel on the inner surface of it. Hereinafter, referring to FIGS. 2A, 2B and 3, the organic light emitting display device having the in-cell touch panel according to the first embodiment of the present disclosure will be explained in detail.

Figure 2A:
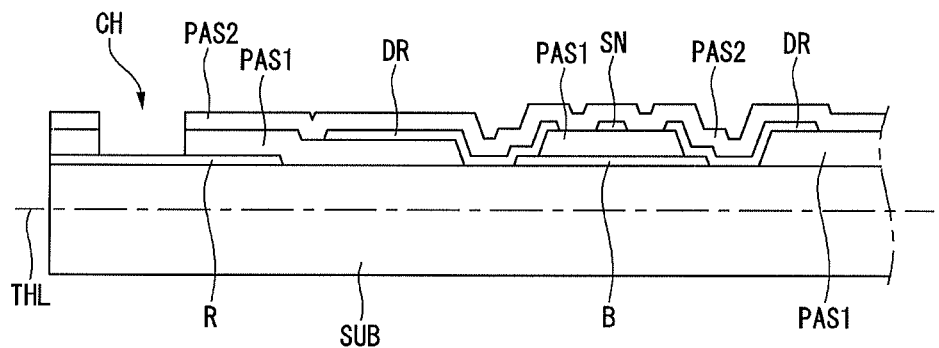
FIG. 2A is the cross-sectional view illustrating the structure of an in-cell touch panel according to the present disclosure.
Figure 2B:
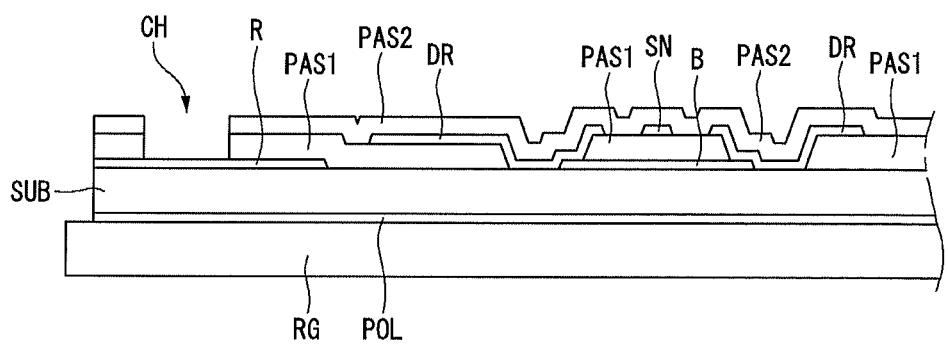
FIG. 2B is the cross-sectional view illustrating the structure of the upper panel of the organic light emitting display device having an in-cell touch panel which is made by thinning the substrate of the touch panel shown in FIG. 2A and then by attaching a toughened glass substrate thereon.
Figure 3:
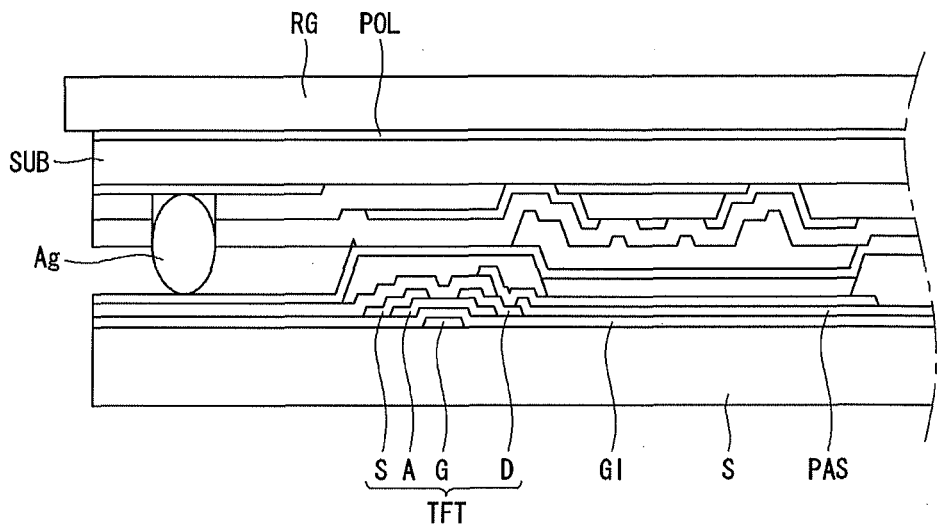
FIG. 3 is the cross-sectional view illustrating the structure of the organic light emitting display device in which the upper panel having the in-cell touch panel as shown in FIG. 2B, and the lower panel as shown in FIG. 1 are attached each other.

FIG. 2A is the cross-sectional view illustrating the structure of an in-cell touch panel according to the present disclosure. FIG. 2B is the cross-sectional view illustrating the structure of the upper panel of the organic light emitting display device having an in-cell touch panel which is made by thinning the substrate of the touch panel shown in FIG. 2A and then by attaching a toughened glass substrate thereon. FIG. 3 is the cross-sectional view illustrating the structure of the organic light emitting display device in which the upper panel having the in-cell touch panel as shown in FIG. 2B, and the lower panel as shown in FIG. 1 are attached each other.

Referring to FIG. 2A, the in-cell touch panel according to the first embodiment comprises a routing part R made of the conductive materials such as metal, and a connecting part B for connecting the driving lines DR, on a substrate SUB. On the routing part R and the connecting part B, a first insulating layer PAS1 is disposed. By patterning the first insulating layer PAS1, both end portions of the connecting part B are exposed. Even though it is not shown in figures, one end portion of the routing part R which will be connected to the driving line DR and the sensor line SN would be exposed.

On the first insulating layer PAS1, the driving lines DR running to the horizontal direction and the sensor lines SN running to the vertical direction are formed. The driving lines DR and the sensor lines SN should not be directly contacted. Therefore, as shown in FIG. 2, a plurality of segments of the driving line DR are bridged and connected in the horizontal direction through the connecting part B, and the sensor line SN is overlapped with the connecting part B over the first insulating layer PAS1. In addition, even though it is not shown in figures, the exposed portion of routing part R is connected to the driving line DR and the sensor line SN. In order to protect the driving line DR and the sensor line SN and to maintain a predetermined distance from the cathode electrode CAT formed on the lower panel, a second insulating layer PAS2 is coated on the whole surface of the substrate SUB. Then, a contact hole CH exposing outer side of the routing part R is formed for electrically connecting the touch panel to the lower panel of the display device and the external driving device.

The in-cell touch panel does not make a bad effect on the image quality of the display device. Therefore, the connecting part B, the driving line DR, and the sensor line SN would be preferably made of the transparent conductive material. Furthermore, the first insulating layer PAS1 and the second insulating layer PAS2 preferably include the photo acryl which is transparent material and of which dielectric property is about 3 F/m much lower than inorganic material of which dielectric property is about 7~8 F/m. If required, the connecting part B would be made of metal material the same with the routing part B. However, for ensuring the image quality of the display device, it is recommended that the connecting part B include a transparent conductive material.

The in-cell touch panel manufactured like above is directly attached to the organic light emitting display device. If thinner touch panel is required, the substrate SUB of the in-cell touch panel would be thinned by back-etching method until the thickness of substrate SUB is thinned down to the thin level line THL.

After that, a polarizer film POL is attached on the outer surface of the substrate SUB of the completed in-cell touch panel. Furthermore, a toughened glass RG is attached on the polarizer film POL to protect the touch panel and the display device.

Then, as shown in FIG. 3, the upper panel of the organic light emitting display device having the in-cell touch panel is joined with the lower panel of the organic light emitting display device according to the FIG. 1. Using silver dots Ag, the routing part R is connected to the signal pad of the upper panel and the driver through the contact hole CH exposing the end portion of the routing part R.

In the organic light emitting display device having the in-cell touch panel according to the first embodiment, the distance between the cathode electrode CAT formed on the lower panel and the driving line DR and the sensor line SN formed on the upper panel is very close. As this distance is getting closer, the parasitic capacitance between them will be increased. This causes the high possibility of the noise occurrence. In other words, that the driving line DR and the sensor line SN of the upper panel are disposed closely to the cathode electrode CAT of the lower panel means that the distance between the touch surface and the driving line DR and the sensor line SN would be longer. This causes the bad sensitivity of the touch function. Therefore, it is required to solve the problems of the high noise and the bad sensitivity which are caused in the in-cell touch panel according to the first embodiment.

Figure 4A:
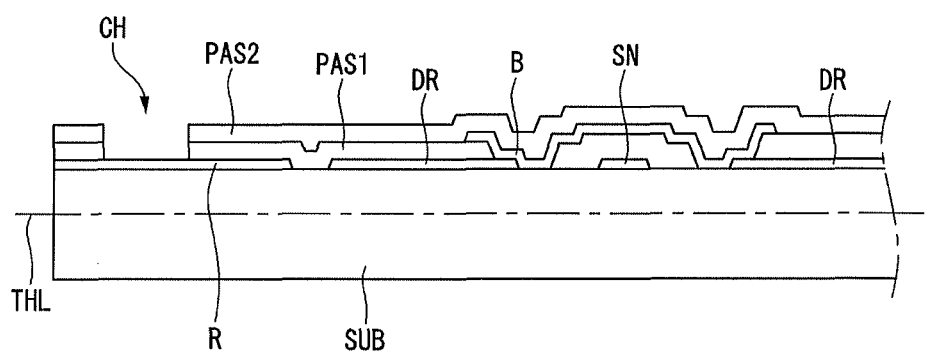
FIG. 4A is the cross-sectional view illustrating the structure of an in-cell touch panel according to the second embodiment of the present disclosure.
Figure 4B:
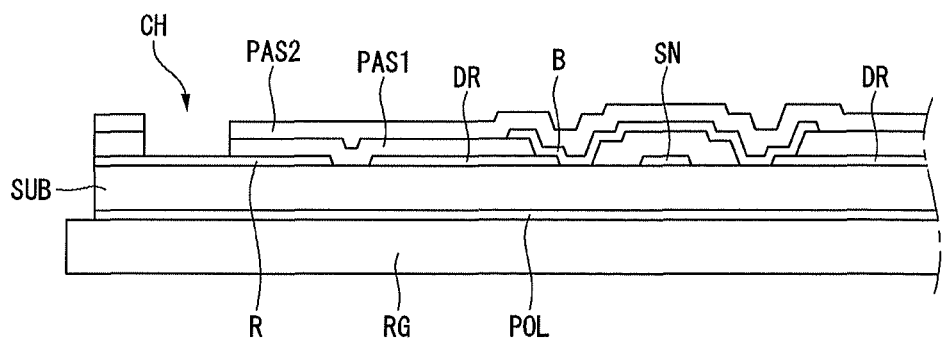
FIG. 4B is the cross-sectional view illustrating the structure of the upper panel of the organic light emitting display device having an in-cell touch panel which is made by thinning the substrate of the touch panel shown in FIG. 4A and then by attaching a toughened glass substrate thereon.
Figure 5:
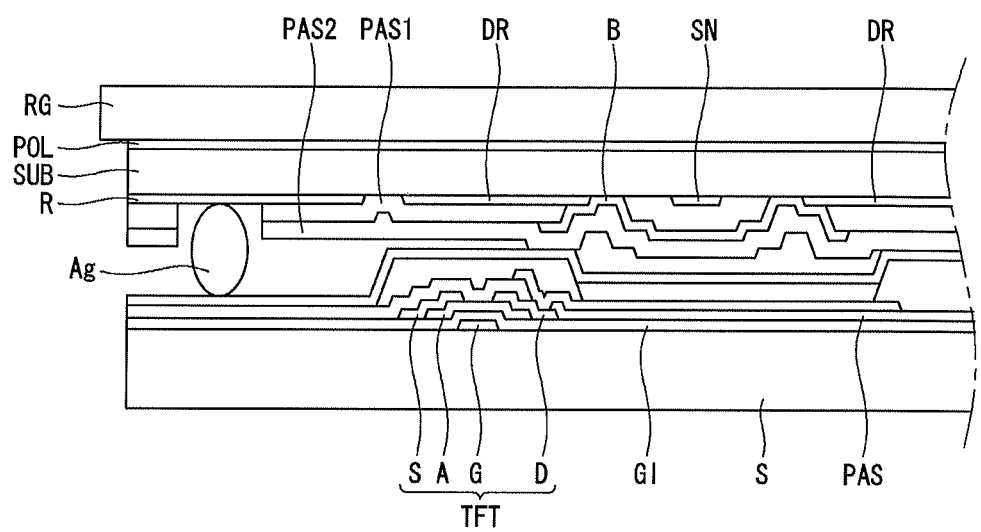
FIG. 5 is the cross-sectional view illustrating the structure of the organic light emitting display device in which the upper panel having the in-cell touch panel as shown in FIG. 4B, and the lower panel as shown in FIG. 1 are attached each other.

Hereinafter, referring to FIGS. 1, 4A, 4B and 5, the second embodiment of the present disclosure will be explained. FIG. 4A is the cross-sectional view illustrating the structure of an in-cell touch panel according to the second embodiment of the present disclosure. FIG. 4B is the cross-sectional view illustrating the structure of the upper panel of the organic light emitting display device having an in-cell touch panel which is made by thinning the substrate of the touch panel shown in FIG. 4A and then by attaching a toughened glass substrate thereon. FIG. 5 is the cross-sectional view illustrating the structure of the organic light emitting display device in which the upper panel having the in-cell touch panel as shown in FIG. 4B, and the lower panel as shown in FIG. 1 are attached each other.

Referring to FIG. 4A, the in-cell touch panel according to the second embodiment comprises a routing part R made of the conductive materials such as metal on a substrate SUB. In the display area of the substrate SUB, a driving line DR running to the horizontal direction and a sensor line SN running to the vertical direction are formed. The driving lines DR and the sensor lines SN should not be directly contacted each other. Therefore, each sensor line SN is formed as one continuously running line to the vertical direction, while each driving line DR includes a plurality of segments which each segment disposed between the sensor lines SN, in horizontal direction. These disconnected segments of one driving line DR is connected and bridged by the connecting portion B, so one driving line DR is formed as the linked running line to the horizontal direction. Even though it is not shown in figures, the driving line DR and the sensor line SN are connected to the exposed one end of the routing part R.

On the driving line DR and the sensor line SN, a first insulating layer PAS I is disposed to cover the whole surface of the substrate SUB. By patterning the first insulating layer PAS1, both ends of the driving line DR are exposed. Then, coating a transparent conductive material on the first insulating layer PAS1 and patterning it, the connecting part B is formed to link all segments of each driving line DR to the horizontal direction. In order to protect the driving line DR and the sensor line SN and to ensure enough distance from the cathode electrode CAT formed on the lower panel, a second insulating layer PAS2 is disposed on the whole surface of the substrate SUB. Furthermore, in order to electrically connect the touch panel with the lower panel and the external driver, a contact hole CH is formed for exposing the outer end of the routing part R.

The in-cell touch panel does not make a bad effect on the image quality of the display device. Therefore, the connecting part B, the driving line DR, and the sensor line SN would be preferably made of the transparent conductive material. Furthermore, the first insulating layer PAS1 and the second insulating layer PAS2 preferably include the photo acryl which is transparent material and of which dielectric property is about 3 F/m much lower than inorganic material of which dielectric property is about 7~8 F/m.

The in-cell touch panel manufactured like above would be directly attached to the organic light emitting display device. If thinner touch panel is required, the substrate SUB of the in-cell touch panel would be thinned by back-etching method until the thickness of substrate SUB is thinned down to the thin level line THL. After that, a polarizer film POL is attached on the outer surface of the substrate SUB of the completed in-cell touch panel. Furthermore, a toughened glass RG is attached on the polarizer film POL to protect the touch panel and the display device.

Then, as shown in FIG. 5, the upper panel of the organic light emitting display device having the in-cell touch panel is joined with the lower panel of the organic light emitting display device according to the FIG. 1. Using silver dots Ag, the routing part R is connected to the signal pad of the upper panel and the driver through the contact hole CH exposing the end portion of the routing part R.

By comparing with the first embodiment, in the organic light emitting display device having the in-cell touch panel according to the second embodiment, the distance between the cathode electrode CAT of the lower panel and the driving line DR and the sensor line SN of the upper panel would be longer than that of the first embodiment. Furthermore, over the driving line DR and the sensor line SN, there are two layered insulating layer including the first insulating layer PAS1 and the second insulating layer PAS2. Therefore, the parasitic capacitance can be more reduced, and the noise can be more effectively prevented than the touch panel according to the first embodiment. Furthermore, that the driving line DR and the sensor line SN of the upper panel are disposed longer and longer from the cathode electrode CAT of the lower panel means that the distance between the touch surface and the driving line DR and the sensor line SN would be closer and shorter. This contributes to increase the sensitivity of the touch panel. Consequently, the in-cell touch panel according to the second embodiment has the merits of the lowered noise and the increased touch sensitivity.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. An in-cell touch panel for flat panel display device comprising:
   a transparent substrate;
   a routing part having a conductive material on an inner side of the transparent substrate;
   a plurality of sensor lines running to a first direction on the inner side of the transparent substrate;
   a plurality of driving lines that each driving line has a plurality of segments running to a second direction between the sensor lines;
   a first insulating layer covering the sensor lines and the driving lines;
   a connecting part linking the segments of the driving line to the second direction; and
   a second insulating layer covering the whole surface of the transparent substrate having the connecting part.

2. The device according to the claim 1, wherein the first insulating layer and the second insulating layer include a dielectric material having the dielectric property of 3 F/m or less.

3. The device according to the claim 1, further comprising:
   a contact hole exposing an outer end of the routing part through the first insulating layer and the second insulating layer; and
   an external connecting pad contacting the exposed outer end of the routing part through the contact hole.

4. The device according to the claim 1, further comprising:
   a polarizer film attaching on an outer surface of the transparent substrate; and
   a toughened glass attaching on the polarizer film.

* * * * *